G. SIMON.
Trimming.
No. 204,626.  Patented June 4, 1878.
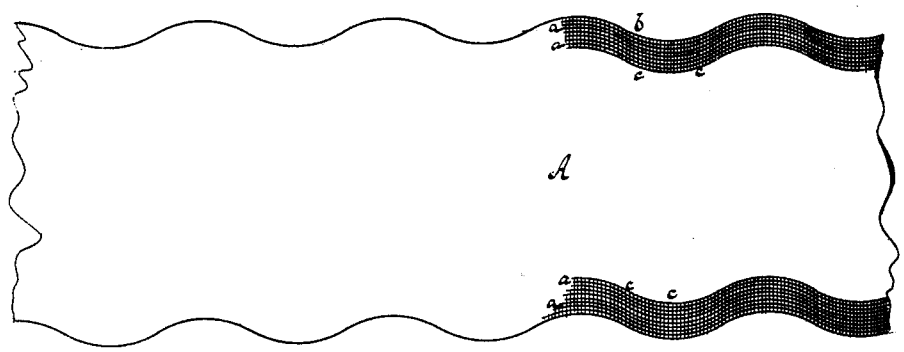
Witnesses
Otto Sifeland
Hugo Brueggemann
Inventor
Gustave Simon
by
Van Santvoord & Hauff
his attorneys.

UNITED STATES PATENT OFFICE.

GUSTAVE SIMON, OF NEW YORK, N. Y.

IMPROVEMENT IN TRIMMINGS.

Specification forming part of Letters Patent No. 204,626, dated June 4, 1878; application filed May 10, 1878.

*To all whom it may concern:*

Be it known that I, GUSTAVE SIMON, of the city, county, and State of New York, have invented a new and useful Improvement in Trimmings for Ladies' and Children's Wear, which improvement is fully set forth in the following specification, reference being had to the accompanying drawing, which represents a face view of my trimming.

This invention relates to a trimming with scalloped edges, which are produced by pressing the fabric in a suitable manner, whereby all the warp-threads are made to form wave-lines, and the edges of the fabric assume the required shape without the necessity of cutting.

The ordinary method of producing scalloped edges on a trimming is by cutting the edges in the required form. This operation is very tedious; it requires considerable practice, and when the trimming is finished the warp-threads do not run parallel to the scalloped edge or edges.

Scalloped trimmings have also been produced on looms by weaving the same in the required form; but such operation is difficult, and admits of a limited use only.

In carrying out my invention I take the trimming and pass the same through between plain fluted or corrugated rollers by means of a gage which has a reciprocating motion, causing the material to pass between the rollers in an undulating line. By this operation all the warp-threads, hems, stitchings, tucks, and other ornamental patterns of the fabric are brought to form wave-lines parallel to each other, and the edges of the fabric become scalloped without cutting. The contours of the scallops thus produced may be perfectly regular, or they may be made irregular, according to the lateral motion imparted to the fabric in its passage between the rollers, and the whole operation can be performed very rapidly.

The selvage on the edges is not destroyed by cutting, and, furthermore, a peculiar effect is imparted to the whole trimming by bringing all the warp-threads, together with the hems, stitchings, tucks, or ornamental patterns, into the form of wave-lines parallel to the scalloped edges.

In the accompanying drawing, the letter A designates a piece of trimming, the warp-threads *a* of which are made to form wave-lines, while the edges *b* are scalloped. The weft-threads *c* remain rectilinear.

This invention is applicable to trimmings of any kind in which it is desirable to produce scalloped edges.

The machine which I use in producing my trimming forms the subject-matter of application for a separate patent, and I have not, therefore, given a detailed description of the same.

What I claim as new, and desire to secure by Letters Patent, is—

1. The process of treating woven trimmings to produce a trimming having scalloped edges, serpentine parallel warp-threads, and rectilinear parallel weft-threads, and which consists in passing straight-edged woven trimming between rollers provided with a reciprocating gage, arranged to cause said trimming to travel lengthwise in an undulating line, substantially as set forth.

2. As a new article of manufacture, a woven trimming having scalloped edges, its longitudinal warp-threads being arranged in serpentine form and parallel to each other, while its transverse weft-threads are rectilinear and parallel, as set forth.

In testimony that I claim the foregoing I have hereunto set my hand and seal this 8th day of May, 1878.

GUSTAVE SIMON. [L. S.]

Witnesses:
W. HAUFF,
E. F. KASTENHUBER.